US012009625B2

(12) United States Patent
Loder et al.

(10) Patent No.: US 12,009,625 B2
(45) Date of Patent: Jun. 11, 2024

(54) EQUIPOTENTIAL MAT USING WIRE MESH NETTING

(71) Applicant: Quanta Associates, L.P., Houston, TX (US)

(72) Inventors: Luke Asbjorn Loder, Hubbard, OR (US); Phillip Howard Quaedvlieg, Burnaby (CA)

(73) Assignee: Quanta Associates, L.P., Houston, TX (US)

(*) Notice: Subject to any disclaimer, the term of this patent is extended or adjusted under 35 U.S.C. 154(b) by 0 days.

(21) Appl. No.: 18/082,239

(22) Filed: Dec. 15, 2022

(65) Prior Publication Data
US 2023/0187852 A1 Jun. 15, 2023

Related U.S. Application Data

(60) Provisional application No. 63/289,956, filed on Dec. 15, 2021.

(30) Foreign Application Priority Data

Dec. 15, 2021 (CA) ................ CA 3142354

(51) Int. Cl.
H01R 4/64 (2006.01)
H01B 7/00 (2006.01)
(Continued)

(52) U.S. Cl.
CPC ............. *H01R 4/64* (2013.01); *H01B 7/0009* (2013.01); *H01R 4/18* (2013.01); *H01R 4/62* (2013.01)

(58) Field of Classification Search
None
See application file for complete search history.

(56) References Cited

U.S. PATENT DOCUMENTS 3,121,825 A * 2/1964 Abegg .................... H05F 3/025
361/216

FOREIGN PATENT DOCUMENTS

CA 2062563 A1 9/1993
CA 2582555 C * 3/2014 ......... H01R 13/5845
(Continued)

OTHER PUBLICATIONS

Alexander Publications, Temporary Grounding for Lineworker Protection How to Safely Install and Remove Personal Protective Grounds, Aug. 1, 2013, pp. 92-93, 95, Alexander Publications, Newport Beach, California, United States.
(Continued)

*Primary Examiner* — Krystal Robinson
(74) *Attorney, Agent, or Firm* — Oathout Law Firm; Elizabeth Gray; Antony C. Edwards

(57) ABSTRACT

Disclosed is an equipotential (EPZ) matting for creating an equipotential zone at a work site. A wire mesh of the EPZ matting is constructed by first cutting desired lengths of cable and laying the lengths of cable parallel and adjacent to each other. The cables are then connected to one another at regularly spaced intervals along the cables using pressed metal ferrules. The connections are staggered as between adjacent cables to create an evenly spaced, open mesh pattern when the wire mesh is tensioned perpendicularly to the longitudinal axes of the cables when initially laid along side one another. The wire mesh is opened and pulled tight for use as EPZ matting on the work site. After work is completed, the mesh is closed and bundled for transport, storage, and re-use.

18 Claims, 5 Drawing Sheets

(51) Int. Cl.
*H01R 4/18* (2006.01)
*H01R 4/62* (2006.01)

(56) References Cited

FOREIGN PATENT DOCUMENTS

CH     642186 A5     3/1984
CN    203056116 U     7/2013

OTHER PUBLICATIONS

White, John E., KCP&L Reconductors Energized 345-kV Line, Sep. 1, 2003, 6 pages, Transmission & Distribution World, A Primedia Publication, United States.
IEEE, IEEE Guide to the Installation of Overhead Transmission Line Conductors, Mar. 12, 2004, pp. 8-9, 22-25, 28-29, 34-35, 52-53, 56-57, 84-85, & 90-91, IEEE, United States.

* cited by examiner

EQUIPOTENTIAL MAT USING WIRE MESH NETTING

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical Field: Embodiments described herein relate to equipotential mats and methods of use and manufacture of the same.

Electrical construction work performed on or near energized or de-energized conductors expose workers to electrical hazards that can cause a life-threatening, life-altering, or life-ending injury. These hazards are often multiplied when working in areas where there is a hazardous difference in electrical potential. To build capacity into wire stringing activities, Applicant has designated equipotential zone (EPZ) matting mandatory at all wire stringing sites. EPZ matting must cover the total area on which the heavy stringing equipment is located as well as the area around it where human crew members perform work.

Prior art EPZ matting has had performance and cost challenges. The EPZ matting described herein provides, in Applicant's view, at least the same electrically protective performance as traditional EPZ matting, while improving the matting's durability and offers a more efficient and economical solution when compared to traditional EPZ matting.

Today, EPZ matting or mats are, in Applicant's view, considered the preferred method of establishing a safe work area in an energized environment. The mats, in one example of the prior art, consist of high-ampacity tinned-copper-braid cable sewn in a grid pattern onto a vinyl/polyester fabric and have ferrules connected at each corner to install grounds or connect to another mat so as to create a grid. These prior art EPZ mats are expensive, and the tarp-like fabric is only semi-durable, keeping in mind that EPZ mats need to endure trucks, outriggers and other heavy equipment being driven on to, and operated on them, which may be over rocky terrain. In addition, weather and other factors in Applicant's experience diminish the life expectancy of such prior art EPZ mats rapidly.

Currently, torn and ripped prior art EPZ mats, such as those described above, cannot in Applicant's experience be repaired in the field. This can mean that for every few set ups, the EPZ mats must be replaced to build an effective EPZ work area for the next work site. In Applicant's experience, the cost of this can be high. At a minimum, it takes at least six of the above-described prior art EPZ mats to properly set up one end of a conductor stringing site. This in Applicant's experience adds up to considerable consumable costs for every few conductor stringing set ups.

The other method currently approved for EPZ protection is the use of semi-rigid paneling. The semi-rigid paneling is commonly referred to in the art as bull or hog paneling. Hog paneling is laid out on the ground and connected by mechanical connectors. The use of hog paneling has a number of handling shortfalls compared to mats, such as those described above; the panels tend to have sharp edges, are awkward to handle, and their rigidity does not conform to the ground, often creating trip hazards. Smaller than a four foot by eight foot sheet of plywood, it can take at least sixteen (16) panels to set up one end of a conductor stringing site, each panel requiring mechanical connections to the next.

In the prior art Applicant is also aware of a published Chinese utility model, CN203056116, which describes a grounding grid system. The grid system includes a metal device, partially or entirely located in a stratum, and a stainless steel mesh, used to guide a lightning-induced current into the ground, connected to the metal device. The steel mesh is laid around the metal device. In some embodiments, the grid system further includes a gravel layer located on top of the steel mesh. Also, in some embodiments, the grid system includes an insulation layer located on top of the steel mesh.

In the prior art it is known to use guard structures supporting protective netting at and over crossings for roads, railways, and the like during conductor stringing for the safety of people passing under the conductors being strung. One such protective netting is a wire mesh netting made of stainless steel cable. In the present disclosure, such wire mesh netting is modified and repurposed for use as a replacement for conventional EPZ matting.

BRIEF SUMMARY

The present disclosure relates to equipotential zone matting for a work site which is or may be in an energized working environment and on which equipment and workmen will be operating. The matting includes a wire mesh constructed of electrically conductive, flexible elongate members which, when the wire mesh is in a closed and planar position, are parallel and adjacent to one another and connected each to an adjacent one of the elongate members by a spaced apart array of electrically conductive pressed ferrules. A first spaced apart array of electrically conductive ferrules are equally spaced apart in a first position as between first and second adjacent elongate members, and a second spaced apart array of electrically conductive ferrules are equally spaced apart in a second position as between the second and third adjacent elongate members, wherein the first and third adjacent elongate members are positioned on opposite sides of the second elongate member so that the first and second spaced apart array of electrically conductive ferrules alternate between the first and second positions in alternating elongate members so as to be equally spaced apart from one another when the wire mesh is in an open and planar position with the elongate members tensioned in a plane perpendicular to longitudinal axes of the elongate members, and wherein the plane contains the elongate members, when the wire mesh is in the closed position.

Advantageously the elongate members are each a length of cable, for example ⅛ inch diameter stainless steel cable. In preferred embodiment the ferrules are pressed metal ferrules, and the spacing between the ferrules is at least six inches as measured along the cables.

The equipotential matting to create an equipotential zone at a work site by:
(a) tensioning the wire mesh into the open position and laying the open wire mesh onto the ground at the work site so as to cover in one electrically continuous wire mesh the entire work site;
(b) electrically grounding the wire mesh; and
(c) allowing the workers onto the wire mesh and positioning the equipment on the wire mesh once the wire mesh is grounded, whereby the grounded wire mesh forms the equipotential zone ready for work operations thereon at the work site.

For example, the work operations may be the stringing of conductors, in which case the equipment includes stringing equipment. Prior to the step of tensioning the wire mesh, the wire mesh may be formed at either the work site or at a remote location and transported in its closed position to the work site for use. Once the matting is no longer required or needs to be replaced, the wire mesh is gathered into its closed position and bundled for storage or transport.

In another aspect, the method of manufacturing the equipotential matting includes:
(a) cutting desired lengths of the elongate members;
(b) laying the lengths of the elongate members parallel and adjacent to each other; and
(c) connecting the elongate members to one another at regularly spaced intervals along the elongate members using pressed metal ferrules, for example at six inch spacing, to form the wire mesh.

In a further embodiment, elongate, electrically conductive copper conductor is bonded to and around, and so as to surround, the perimeter of the wire mesh. The copper conductor may be braided flat copper conductor, which for example may be bonded to, so as to criss-cross, the wire mesh.

BRIEF DESCRIPTION OF DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION

The description that follows includes exemplary apparatus, methods, techniques, and instruction sequences that embody techniques of the inventive subject matter. However, it is understood that the described embodiments may be practiced without these specific details.

The equipotential zone (EPZ) matting disclosed herein may be, in one example, modified and repurposed wire mesh netting used in prior art guard structures. The EPZ matting, for example and without intending to be limiting, may be made from stainless steel cables connected together by metal ferrules at a regular spacing so as to produce a mesh like structure when tensioned. The EPZ matting does not need fabric to maintain continuity and improves grip and traction on the ground for workmen without creating a tripping hazard such as found in the use of prior art rigid mats. Ease of use, portability, time saved, and adaptability makes the EPZ matting disclosed herein an improvement to an existing hazard mitigation procedure for the power transmission industry.

Figure 4:
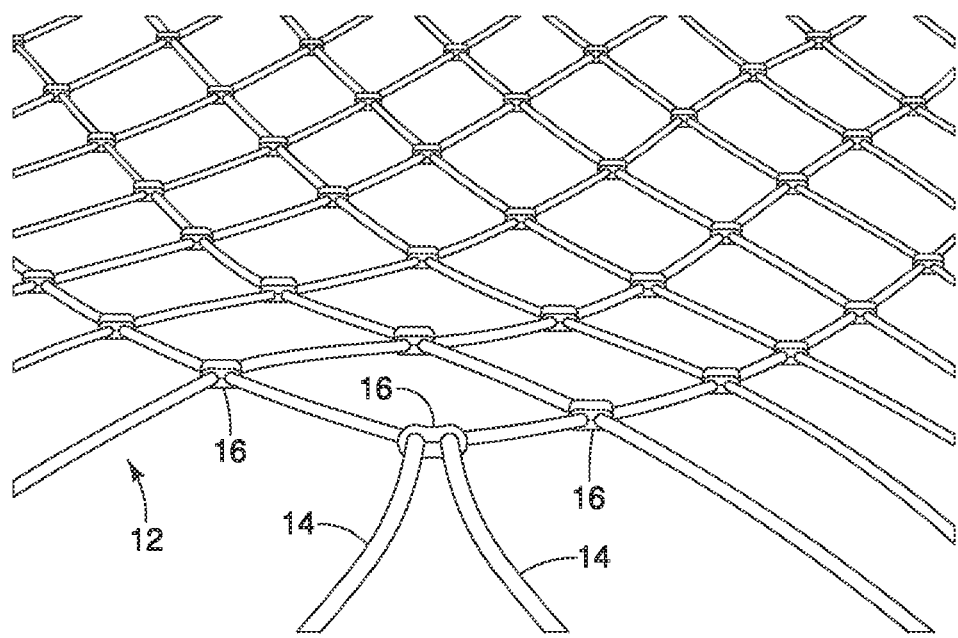
FIG. 4 is an end view of pressed ferrules connecting cables of the matting of FIG. 1.
Figure 1:
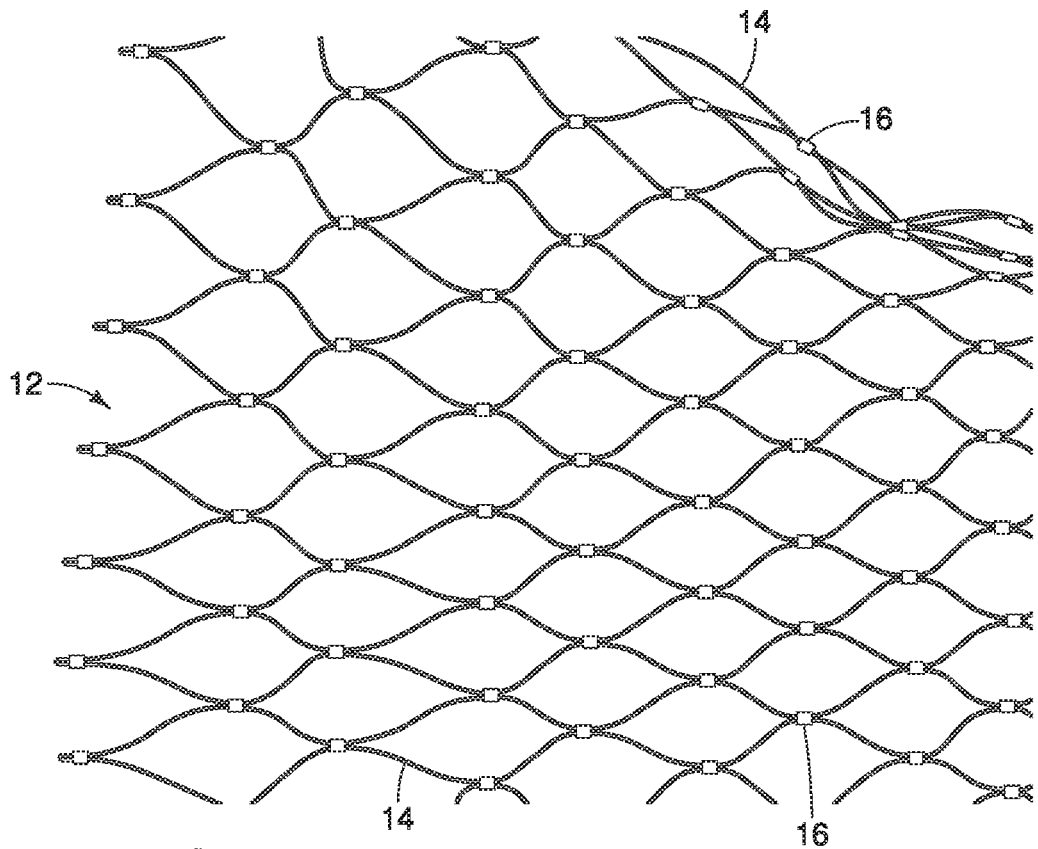
FIG. 1 is a plan view of one embodiment of the equipotential zone (EPZ) matting disclosed herein, wherein the matting is almost entirely stretched open in its deployment plane.

Figures (alternatively referred to herein as "FIGS.") 1 to 8 illustrate embodiments of the EPZ matting disclosed herein. As used herein, EPZ matting is alternatively referred to as EPZ 10. With reference to FIG. 1, in one embodiment, EPZ 10 includes a mesh 12 (alternatively referred to herein as a wire mesh) constructed of electrically conductive, flexible elongate members. In the illustrated embodiment, and without intending to be limiting, the elongate members are lengths of ⅛th inch stainless steel aircraft cable. The cables 14 are connected to each other at regularly spaced intervals along each cable using electrically conductive ferrules 16. In one embodiment, the ferrules 16 are pressed metal, such as aluminum, ferrules. In one embodiment, the cables 14 are physically and electrically connected to each other with the ferrules 16 at six inch spacings along the cables. Ferrules 16 are offset between adjacent cables so as to produce a mesh 12 having substantially identical apertures 12A when the cables 14 are fully separated perpendicularly relative to their length.

Figure 8:
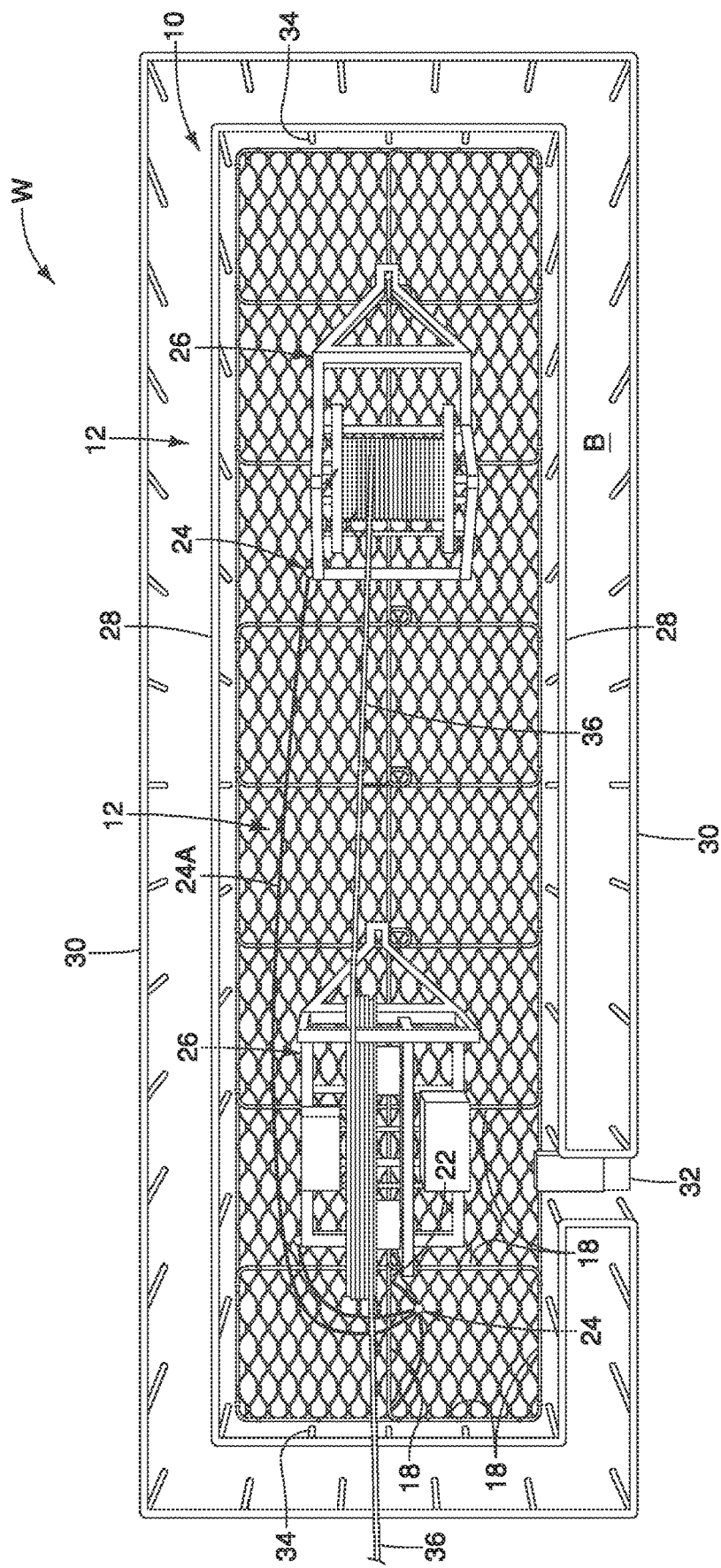
FIG. 8 is an aerial view of an EPZ using two end-to-end mats of FIG. 7, and having inner and outer barricade fences around the mats, and an access bridge onto the EPZ.

In some embodiments, the mesh 12 may be constructed at the work site W (illustrated by way of example in FIG. 8). In other embodiments, mesh 12 may be constructed prior to transportation to the work site W. The work site W is typically an energized working environment, or at least must be treated as one due to the possibility of induced currents for example, where heavy equipment 26 and workmen (not shown) will be operating.

Figure 5:
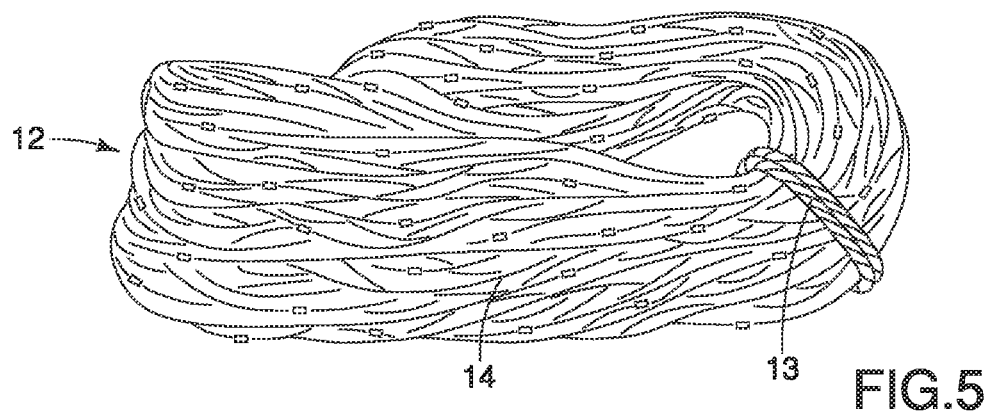
FIG. 5 is a view illustrating the matting of FIG. 1 in its fully closed and bundled position and ready for storage or transportation to another work site.

The use of cable 14, such as steel aircraft cable, and the use of pressed ferrules 16 produces a usefully flexible, light weight and collapsible mesh 12 which allows the mesh 12 to be deployed at the work site W with reduced breakage of the mesh and, in Applicant's view, more easily than prior art mats. Once work operations at the work site W are completed, mesh 12 may be easily collapsed laterally, relative to the long or longitudinal dimension of the cable 14, and rolled, folded, or coiled as seen in FIG. 5 for storage or transportation to another work site for re-use. Portability for transportation is improved as compared to the prior art mats.

The flexible, collapsible, durable and light weight properties of the mesh 12 makes the EPZ 10 disclosed herein easily portable and relatively simple to use, and to keep re-using, as better described by way of example below.

The EPZ 10 using mesh 12 is constructed using all pressed connections. Pressed ferrules 16 have shown through testing by Applicant to produce an EPZ 10 having improved conductivity as compared to the traditional EPZ solutions including multiple prior art mats or hog panels.

As to reduced weight; mesh 12 is sufficiently light that in testing by Applicant a single workman has safely managed to install a wire mesh 12 large enough for one EPZ 10 at a work site. In Applicant's experience, installing traditional EPZ matting is typically a two-person job because the traditional EPZ matting is heavy and awkward to handle.

Figure 2:
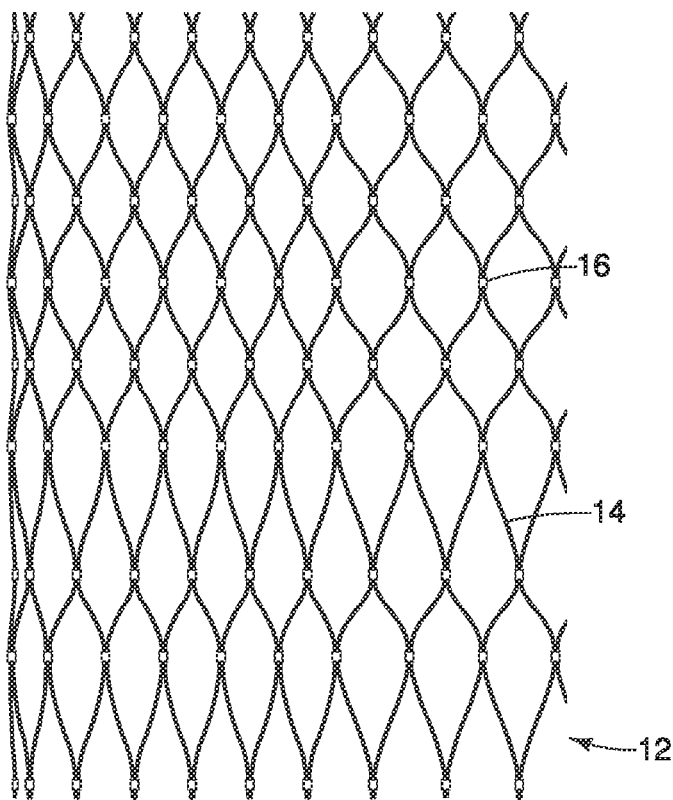
FIG. 2 is the matting of FIG. 1 with the matting partially collapsed in the deployment plane into its partially closed position.
Figure 3:
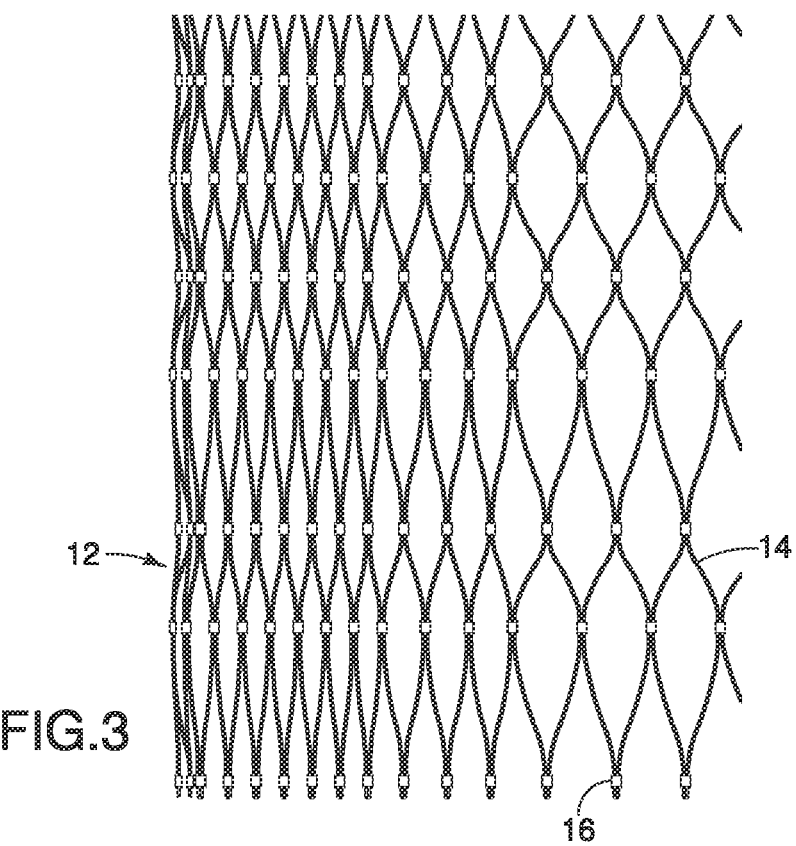
FIG. 3 is the matting of FIG. 1 with the matting mostly collapsed in the deployment plane into its almost fully closed position prior to a fully closed and bundled position of the matting for its storage or transport.

In one embodiment, for deployment, the mesh 12 disclosed herein is unloaded while bundled in its fully closed position (as seen in FIG. 5 for example). Next, mesh 12 is positioned in the location at the work site W where the EPZ 10 is to be created. Mesh 12 is then stretched to its fully open position so as to fully open the mesh apertures 12A in a deployment plane (assuming in this example that the ground is flat) and laid down in contact with the ground, staked and grounded by one workman. Where the size of the work site dictates that more than one mesh 12 be used in order to cover the ground and make a sufficiently large EPZ 10, more than one mesh 12 may be used, where each mesh 12 will be a segment in an electrically interconnected array of a plurality of mesh 12 (herein the term "mesh 10" being used for both the singular and the plural) which as an electrical whole form a single EPZ 10. As noted above, in testing, the mesh 12 forming the entire EPZ 10 may often be disassembled and put away or transported as needed by just one workman. FIGS. 1, 2 and 3 show a section of a mesh 12 being collapsed in its plane of deployment from almost fully stretched open, to a partially collapsed state, to an almost fully collapsed state, respectively.

Figure 6:
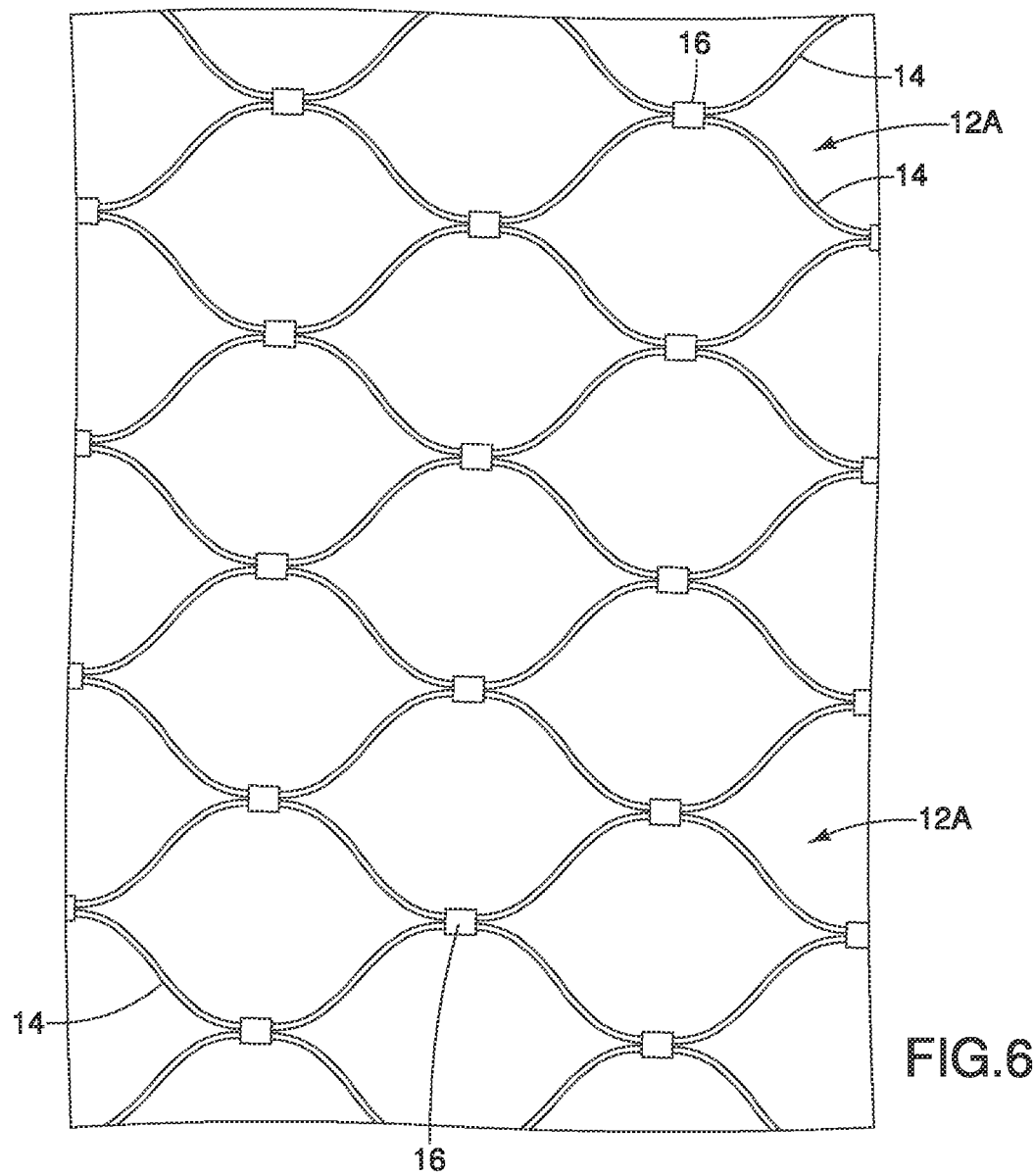
FIG. 6 is a view of a section of the matting of FIG. 1 in its fully deployed position.

As to improved flexibility, the mesh 12 is relatively easy to manipulate and set in place on even or uneven ground. In addition to being easily collapsed, the mesh 12 can be rolled, folded, and bunched up or coiled, allowing for storage of mesh 12 in small spaces and containers, without tangling. FIG. 5 shows a mesh 12 in its storage or transportation state, with the mesh 10 bunched and coiled, secured by a rope 13 around it. In testing by Applicant, a single workman was able to carry the bundled wire mesh 12 of FIG. 5 over to a work site W and place it on the ground, untie it, and unfold it out across the ground in minutes without trouble or having to untangle it. A portion of the resulting fully deployed wire mesh 12 is shown in FIG. 6. Two mats of wire mesh 12 are shown fully deployed in the EPZ of FIG. 8. The mesh 12 can be put away in compact storage, taking up much less storage space than the required room needed for traditional EPZ mats. Similarly, they can be more easily transported.

In addition, unlike traditional EPZ mats, in Applicant's view, the mesh 12, once installed, will not be as prone to being blown around by, for example by helicopter downwash, in the work site due to the mesh porosity as compared to conventional EPZ mats, thereby reducing a potential hazard.

As to durability, an embodiment of mesh 12 constructed of ⅛th inch diameter stainless steel aircraft cable 14, connected together at regular six inch spacing, using pressed aluminum ferrules 16 between the cables 14, was tested by Applicant. During testing the resulting mesh 12 was found to be durable and stood up well to wear and tear from heavy equipment, for example the heavy equipment 26 seen in FIG. 8, including the equipment's tires or tracks, even over rough terrain. When and if a mesh 12 does become damaged, Applicant has found during testing that repairs may be made on the work site W immediately with spare cable 14 and ferrule 16 material and basic tooling as such repairs would be known to one skilled in the art. Maintenance is, in Applicant's view, also simple and cost effective.

In the prior art, conventional EPZ mats, due to their dark color, may experience a significant increase in ground temperature in sunny weather, much like being on asphalt, thereby occasionally making heat illness a concern for workers at a work site. The present wire mesh 12 does not have this negative impact on the work site temperatures due to lighter color and much smaller volume and area (due to the thin cables) when laid out on the ground.

The wire mesh according to the present disclosure may be made and altered for most any size worksite. Further, the time that it takes to set up an EPZ using one or more mesh 12 is in Applicant's experience during testing only a fraction of the time that it takes for the traditional EPZ mats or hog paneling to be set up and takes less labor and preparation. As will be understood by persons skilled in the art, continuity tests may be done on a work site anytime a new EPZ 10 using mesh 12 is set up to prove and document that the EPZ 10 is going to protect the workmen on the work site.

In one embodiment, the mesh 12 of the EPZ 10 described herein are built by first cutting desired lengths of ⅛th inch stainless steel aircraft cable 14, and laying the lengths of cable 14 parallel and adjacent to each other. The cables 14 are then connected to one another at regularly spaced intervals along the cables using pressed metal ferrules 16. For example, the ferrules 16 may be spaced at six inch spacings. As better seen in FIG. 6, the connections using ferrules 16 are evenly staggered as between adjacent cables 14 to create the illustrated open mesh pattern of apertures 12A when the mesh 12 is tensioned perpendicularly to the longitudinal axes of the cables when initially laid along side one another.

The mesh 12 is opened at the work site W (FIG. 8) to create an EPZ 10. The mesh 12 is closed for transport and storage (FIG. 5). The electrically conductive pressed metal ferrules 16 and the flexible cables 14 in Applicant's view reduce the risk that the mesh 12 will break at the connection points after repeated usage due to the mesh being repeatedly opened and closed. Applicant has found that the mesh 12 maintains consistent electrical continuity, even if a piece of the cable is broken or damaged while in use. This is in Applicants view an improvement over the continuity risks associated with traditional EPZ mats and hog panels. Applicant postulates that, as compared to welding the connection points between adjacent cables, the use of pressed ferrules may reduce the stress concentrations, and therefore extend the life of the mesh, at the connection points that result from repeated opening and closing of the mesh 12 and that also result from wear and tear associated with use of the mesh 12 under heavy equipment 26 being operated and moved.

While testing it was observed that the given example of six inch spacing between connections, which is not intended to be limiting, ensures that when the wire mesh is open and stretched tight, as shown in FIG. 6, a workman will while walking over the mesh not lose contact with the mesh 12. In other embodiments the spacing between the ferrules connecting adjacent cables may be for example 10 to 15 inches depending on the terrain, it being understood that for any particular spacing, the spacing is consistently the same on and across any particular mesh 12.

Thus in a further embodiment, mesh 12, again constructed of ⅛ inch stranded stainless steel cable 14 and crimped together with aluminum ferrules 16, is constructed using 60 individual 35 foot lengths of the cable 14, crimped so as to electrically connect to the adjacent cables every 7½ inches. A useful size of mesh 12 measures, when fully open and laid flat, 15 feet by 30 feet. Again, for larger EPZs, multiple mesh 12 may be joined together to form a larger continuously electrically conductive EPZ.

Figure 7:
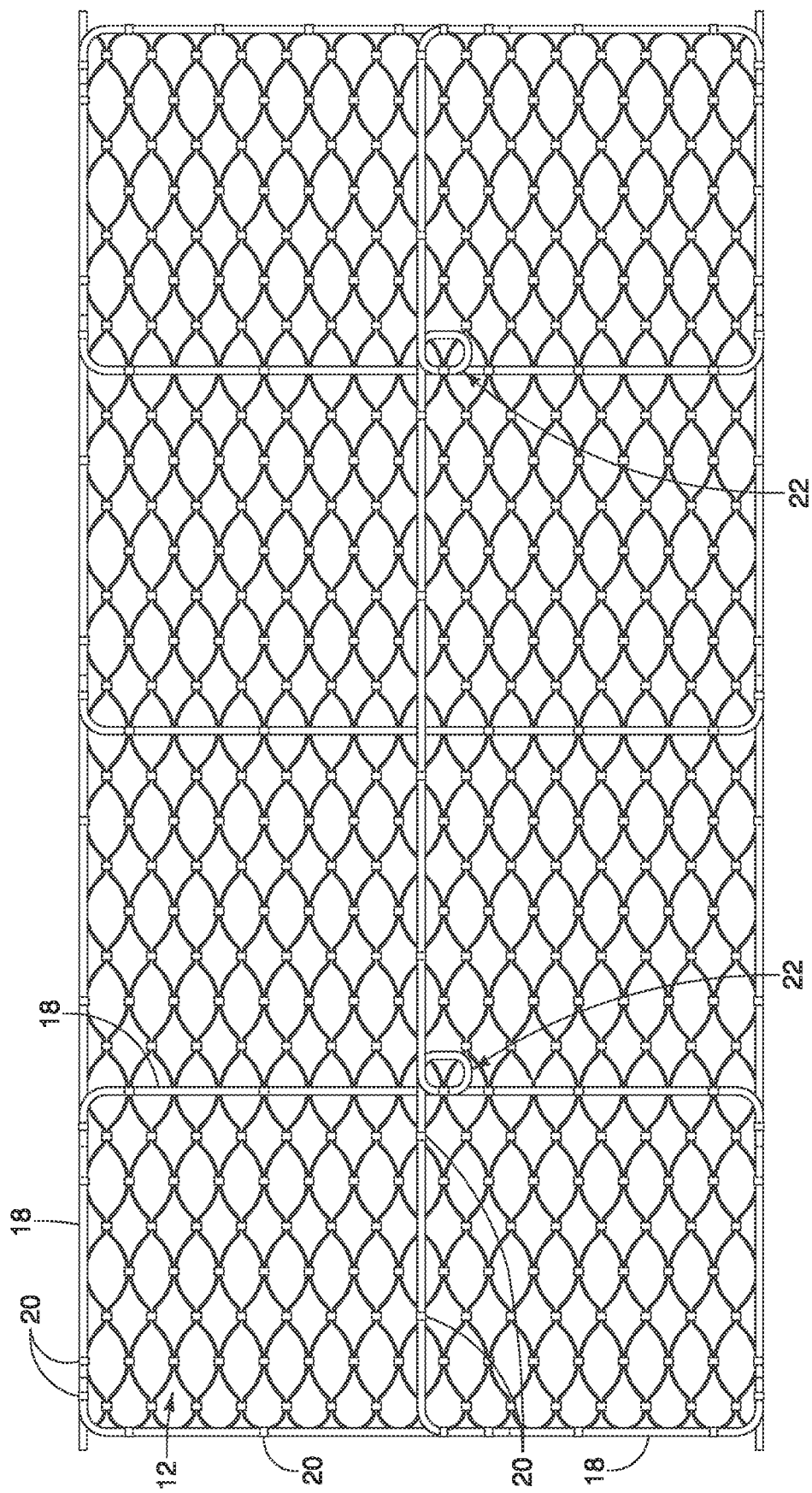
FIG. 7 is, in plan view, a wire mesh mat using the mesh of FIG. 1, having braided copper conductor bonded around the perimeter of, and criss-crossing the mat.

In Applicant's view, in some circumstances, mesh 12 alone may not be sufficient to maintain electrical continuity during an accidental energization. In such cases, a copper conductor 18, such as seen in FIG. 7, may be incorporated into and bonded to mesh 12. Advantageously, to maintain the flexibility of the mat formed of mesh 12 and the copper conductor 18, the copper conductor 18 may be for example one inch wide, flat, tinned, braided copper conductor (for example, equivalent to #4 stranded copper).

As seen in FIG. 7, the braided copper conductor 18 is installed around the perimeter of the mesh 12, or around the perimeter of the combined plurality of mesh 12 if more than one mesh 12 is used. Copper conductor 18 is installed lengthwise and crosswise (longitudinally and laterally respectively) on the mesh 12 as seen in FIG. 7. Copper conductor 18 may be crimped at three foot intervals to cables 14 using Burndy™, model YGH C2C2, connectors 20 or equivalent. Loops 22 may be formed from the copper conductors 18 to provide electrical connection points for ground rods 24, such as seen in FIG. 8. In the aerial view of FIG. 8, heavy equipment 26 is parked on two joined mesh 12 forming EPZ 10. When joining the two mesh 12 together, the copper conductor 18 on each mesh 12 are connected together using for example bolted connectors, such as Burndy™ split bolts, every five feet to make a good electrical connection. If only one ground rod 24 is used, it should be located where all equipment 26 and the running ground may be easily connected to the ground rod 24. The mesh 12 is also bonded to the ground rod 24, either directly to the copper conductor 18, or with a short ground cable 24A from the ground rod 24 to the copper loop 22. If more than one ground rod 24 is installed, ground rods 24 are connected to each other using a ground cable 24A (for example 4/0 ground cable) and are also bonded to mesh 12.

As seen in FIG. 8, an inner barricade fence 28 around the perimeter outside edge of mesh 12. A second, outer barricade fence 30 is installed around the entire barricade fence 28, with the exception of where an electrically insulated access bridge 32 is installed. A distance of at least eight feet is maintained between fences 28 and 30. Barricade fence 28 may be supported with non-conductive posts 34, of for example plastic or fiberglass. If electrically conductive posts are used, they are bonded to the copper conductor 18. In use, no electrically conductive objects, such as wires, antenna cables, etc., are permitted to span the barricaded area B defined between fences 28 and 30, and no conductive objects may be passed between workmen across the barricaded area B. Step potential differences or gradients may be present in the vicinity of stringing EPZ's 10 stringing conductor 36, thereby exposing workmen to hazardous electrical potential differences, when transitioning from ground potential onto EPZ 10. Transitions onto and off from EPZ 10, and in particular onto and off from mesh 12 are made, for example, using electrically insulated access bridge 32 spanning over barricaded area B.

In one embodiment, access bridge 32 provides a minimum 40 kV insulation value, and provides adequate distance for the step potential difference to dissipate into the ground. The length of access bridge 32 is a minimum of eight feet, and longer if the distance to be bridged across area B is greater. For example, the distance across area B may be 12 feet in the case of higher voltages such as between 345 kV and 500 kV, in which case the length of access bridge 32 would be a minimum of 12 feet to accommodate the greater potential difference. The insulation value of access bridge 32 may need to be increased depending on the potential hazard, ground condition, and ground resistance under EPZ 10 as would be known to one skilled in the art.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An equipotential zone matting for a work site and on which equipment and workmen will be operating, wherein the work site is or may be in an energized working environment, the matting comprising:
    a wire mesh constructed of electrically conductive, flexible elongate members which, when the wire mesh is in a closed and planar position, are parallel and adjacent to one another and connected each to an adjacent one of the elongate members by a spaced apart array of electrically conductive pressed ferrules, wherein a first said spaced apart array of electrically conductive ferrules are equally spaced apart in a first position as between first and second adjacent elongate members, and wherein a second said spaced apart array of electrically conductive ferrules are equally spaced apart in a second position as between the second and third adjacent elongate members, wherein the first and third adjacent elongate members are positioned on opposite sides of the second elongate member so that the first and second spaced apart array of electrically conductive ferrules alternate between the first and second positions in alternating elongate members so as to be equally spaced apart from one another when the wire mesh is in an open and planar position with the elongate members tensioned in a plane perpendicular to longitudinal axes of the elongate members, and wherein the plane contains the elongate members, when the wire mesh is in the closed position.

2. The matting of claim 1, wherein the elongate members are each a length of cable.

3. The matting of claim 2, wherein the cable is a stainless steel cable.

4. The matting of claim 2, wherein the spacing between the ferrules is at least six inches as measured along the cables.

5. The matting of claim 2, wherein the cable is of ⅛th inch diameter.

6. The matting of claim 1, wherein the ferrules are pressed metal ferrules.

7. A method of using the equipotential matting of claim 1 for creating an equipotential zone at a work site where equipment and workmen will be operating and wherein the work site is an energized working environment, the method comprising:
    (a) tensioning the wire mesh into the open position and laying the open wire mesh onto a ground on the work site so as to cover in one electrically continuous wire mesh the entire work site;
    (b) electrically grounding the wire mesh; and
    (c) allowing the workers onto the wire mesh and positioning the equipment on the wire mesh once the wire mesh is grounded, whereby the grounded wire mesh forms the equipotential zone ready for work operations thereon at the work site.

8. The method of claim 7, wherein the work operations are stringing conductors, and the equipment includes stringing equipment.

9. The method of claim 7, wherein prior to the tensioning step, forming the wire mesh at the work site.

10. The method of claim 7, wherein prior to the tensioning step, transporting the wire mesh in the closed position to the work site.

11. The method of claim 7 further comprising gathering, closing and bundling the wire mesh for storage or transport when work operations on the work site are completed.

12. The method of claim 11 further comprising forming the wire mesh at the work site.

13. A method of manufacturing the equipotential matting of claim 1, the method comprising:
(a) cutting desired lengths of the elongate members;
(b) laying the lengths of the elongate members parallel and adjacent to each other; and
(c) connecting the elongate members to one another at regularly spaced intervals along the elongate members using pressed metal ferrules to form the wire mesh of claim 1.

14. The method of claim 12 further comprising connecting the elongate members at six (6) inch spacings.

15. The matting of claim 1 further comprising a further, elongate, electrically conductive conductor bonded to around, and so as to surround, the perimeter of the wire mesh.

16. The matting of claim 15 wherein the further, elongate, electrically conductive conductor is copper conductor.

17. The matting of claim 16 wherein the copper conductor is braided flat copper conductor.

18. The matting of claim 16 further comprising copper conductor bonded to, so as to criss-cross, the wire mesh.

* * * * *